US011230070B2

(12) United States Patent
Gaillard et al.

(10) Patent No.: US 11,230,070 B2
(45) Date of Patent: *Jan. 25, 2022

(54) APPLICATION HEAD COMPRISING A CUTTING SYSTEM WITH INTEGRATED CONTROL IN TRANSLATION AND IN ROTATION

(71) Applicant: CORIOLIS GROUP, Quéven (FR)

(72) Inventors: Loïc Gaillard, Lanester (FR); Julien Coudurier, Lorient (FR)

(73) Assignee: CORIOLIS GROUP, Quéven (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/733,136

(22) PCT Filed: Nov. 23, 2018

(86) PCT No.: PCT/FR2018/000255
§ 371 (c)(1),
(2) Date: May 27, 2020

(87) PCT Pub. No.: WO2019/102082
PCT Pub. Date: May 31, 2019

(65) Prior Publication Data
US 2020/0353703 A1    Nov. 12, 2020

(30) Foreign Application Priority Data

Nov. 27, 2017   (FR) ..................... 1701248

(51) Int. Cl.
*B29C 70/38*   (2006.01)
*B29C 70/54*   (2006.01)
*B29K 101/12*   (2006.01)

(52) U.S. Cl.
CPC .......... *B29C 70/384* (2013.01); *B29C 70/545* (2013.01); *B29C 70/382* (2013.01); *B29C 2793/0027* (2013.01); *B29K 2101/12* (2013.01)

(58) Field of Classification Search
CPC ............... B29C 70/384; B29C 70/545; B29C 2793/0027
See application file for complete search history.

(56) References Cited

U.S. PATENT DOCUMENTS 7,849,903 B2 * 12/2010 Vaniglia ................ B29C 70/545
156/517
8,205,532 B2   6/2012 DeVlieg et al.
(Continued)

FOREIGN PATENT DOCUMENTS

DE    102013111100 A1   4/2015
DE    102015224689 A1   6/2017
(Continued)

OTHER PUBLICATIONS

International Search Report and Written Opinion for PCT Application No. PCT/FR2018/000255, dated May 14, 2019.
(Continued)

*Primary Examiner* — Mark A Osele
*Assistant Examiner* — Christopher C Caillouet
(74) *Attorney, Agent, or Firm* — Patterson Thuente Pedersen, P.A.

(57) ABSTRACT

An application head specially designed for producing parts made of composite materials, comprising an application roller, guiding means defining a guiding plane and a cutting system for cutting a fiber comprising a first tool movable in translation along a cutting direction and a second tool. The cutting system comprises an integrated control means able to displace the first tool in translation along the cutting direction and to displace the first and second tool together, in rotation around a direction parallel to the application roller.

7 Claims, 8 Drawing Sheets

(56) References Cited

U.S. PATENT DOCUMENTS

| | | | |
|---|---|---|---|
| 10,821,682 B2* | 11/2020 | Hamlyn | ................ B29C 70/384 |
| 2017/0197372 A1 | 7/2017 | Modin et al. | |
| 2021/0107237 A1 | 4/2021 | Gaillard et al. | |

FOREIGN PATENT DOCUMENTS

| | | |
|---|---|---|
| EP | 0846551 A1 | 6/1998 |
| EP | 2228200 A1 | 9/2010 |
| ES | 2253005 A1 | 5/2006 |
| FR | 3011499 A1 | 4/2015 |
| WO | WO-2008132301 A2 | 11/2008 |
| WO | WO 2010/070245 A1 | 6/2010 |
| WO | WO 2017/072421 A1 | 5/2017 |
| WO | WO-2017097818 A1 | 6/2017 |

OTHER PUBLICATIONS

Application and File history for U.S. Appl. No. 16/767,504, filed Nov. 9, 2020. Inventors: Gaillard et al.
International Search Report and Written Opinion for PCT/FR2018/000254, dated Feb. 27, 2019, 8 pages.
International Search Report and Written Opinion for PCT/FR2018/000257, dated Feb. 13, 2019, 9 pages.

\* cited by examiner

APPLICATION HEAD COMPRISING A CUTTING SYSTEM WITH INTEGRATED CONTROL IN TRANSLATION AND IN ROTATION

TECHNICAL FIELD

Embodiments of the present invention relate to an application head especially designed for a fiber application machine to produce composite material parts, and more particularly a fiber application head equipped with a particular cutting system. Embodiments also relate to a method for manufacturing composite material parts by means of a corresponding application head.

BACKGROUND ART

Fiber application machines are known for the application by contact on a layup tool, such as a male or female mold, of a fiber or a wide strip formed of one or more continuous flat fibers, of the tow type, dry or impregnated with thermosetting or thermoplastic resin, in particular carbon fibers, consisting of a multitude of carbon threads or filaments.

These fiber application machines, also called fiber placement machines, conventionally comprise an application head, a displacement system able to displace the application head, storage means for storing the fibers and conveying means for conveying the fibers from the storage means to the application head. The latter conventionally comprises an application roller for applying a fiber or a strip of several fibers onto an application surface of a layup tool, a guiding system for guiding a single fiber or a strip of several fibers to the application roller, and for each fiber, a cutting system for cutting a fiber, rerouting means for rerouting the fiber to the application roller after a cut by the cutting system, and a clamping system for clamping the fiber that has just been cut.

Each cutting system conventionally comprises a first cutting tool consisting of a blade, movable in translation along a cutting direction, and a second cutting tool.

In some of the proposed cutting systems, such as in ES 2 253 005 or WO 2008/132301, the movable blade abuts in the active position against a counter-tool, for example a roller or a bar made of elastomeric material. This type of cut is satisfactory, although the number of cuts may be limited, in particular due to the relatively rapid wear of the cutting edge of the blade or the counter-tool. Furthermore, these cutting systems appear to be unsuitable for cutting large fiber widths because of the cutting force required to instantaneously cut the fiber across its entire width.

Other systems, described in particular in WO 2017/072421 and U.S. Pat. No. 8,205,532, use a fixed blade or counter-blade, the fiber being cut by shearing as the blade is displaced relative to the counter-blade. These cutting systems allow a greater number of cuts before they need to be replaced. In addition, these cutting systems allow for a guillotine-type cut, using blades with an inclined cutting edge to progressively cut the fiber and thus reduce the cutting force.

It was found that in the case of a guillotine cut, the cut end of a fiber could exhibit an inclination with respect to the longitudinal direction of the fiber. This inclination is explained by the fact that during the time interval corresponding to the displacement of the first tool, the application roller continues to apply the fiber that is being cut. The greater the width of the fiber or the longer the time interval between an inactive position and an active position of said first tool, the greater the inclination is.

EP 846 551 discloses an application head in which a first tool is movable in translation in one cutting direction. A second tool is fixed relative to the first tool along the cutting direction. The first and second tools are movable together in translation along a fiber displacement direction. The translation along the cutting direction is provided by a first control means. The translation along the fiber displacement direction is provided by a second control means.

The above-mentioned ES 2 253 005 or U.S. Pat. No. 7,849,903 discloses an application head in which a first cutting tool is movable in translation along a cutting direction and movable in rotation in a plane perpendicular to the rotation axis of the application roller. The translation of this first tool is controlled by a first control means. A second cutting tool is movable in rotation around a fixed axis relative to the application roller. The rotation of this second tool is controlled by a second control means, synchronized with the displacement of the fiber. It should be noted that in ES 2 253 005 as in U.S. Pat. No. 7,849,903, the alignment of the first and second cutting tools is not maintained during the translation of the first tool.

The displacement of the cutting system with the fiber being laid up ensures a good quality of cut, with an end cut substantially perpendicular to the longitudinal direction of the fiber. The duplication of the control means in these application heads, however, results in an increase in the overall dimensions of the cutting system.

The purpose of the invention is to propose a solution to overcome at least one of the above-mentioned drawbacks.

For this purpose, embodiments of the invention relate to an application head especially designed for producing composite material parts, comprising an application roller, and, preferably for each fiber, guiding means defining a guiding plane and a cutting system for cutting a fiber guided by the guiding means and applied by the application roller, the cutting system comprising a first tool movable in translation along a cutting direction between an inactive position and an active position, and a second tool, characterized in that the cutting system comprises an integrated control means able to displace at least the first tool in translation along the cutting direction and to displace the first and second tools together, in rotation around a direction parallel to the rotation axis of the application roller between an initial position and an end position.

The term "together" means that the first and second cutting tools maintain their alignment along the cutting direction while being displaced.

An integrated control means enables the reduction of the overall dimensions of the cutting system in the application head while making the translational motion along the cutting direction to perform the cut, with a rotational motion of the cutting direction to displace the cutting tools with the fiber being applied by the roller, the integrated control means according to embodiments of the invention being able to displace the cutting tools between a first state in which the cutting tools are in an inactive position and in an initial position, and a second state in which the cutting tools are in an active position and in a final position. The inclination of the cut end of the fiber is thereby reduced or even eliminated. It should be noted that this rotation causes the fiber to deviate slightly from a direction of translation of the fiber. However, this deviation is kept within acceptable limits. In addition, since the speed difference between the cutting tools and the fiber is reduced or even zero, the abrasion to which the cutting tools are subjected due to the friction of the fiber is reduced, thus slowing down the wear of the cutting tools.

The first tool and the second tool of the cutting system are formed by two blades, or a blade and a counter-tool, the counter-tool being then formed, for example, by a bar against which the blade abuts to cut the fiber. In the case of a blade and a counter-tool, the first tool is preferably formed by a blade, the counter-tool forming the second cutting tool.

According to an embodiment, the head according to the invention further comprises, preferably for each fiber, rerouting means for rerouting a fiber to the application roller after a cut made by the cutting system, as well as preferably a clamping system for clamping a fiber that has just been cut.

According to an embodiment, the integrated control means is able to displace the first tool and the second tool in translation along the cutting direction between inactive positions and active positions. Advantageously, the integrated control means comprises a control lever movable around a first rotation axis and provided with a first lever arm articulated to a first tool holder carrying the first tool and a second lever arm articulated, by means of a link, to a second tool holder carrying the second tool, said second lever arm being controlled in displacement by a cylinder rod, the first tool holder being articulated to a second rotation axis by means of a link and said first and second tool holders being connected together by a sliding connecting means for sliding along the cutting direction.

In this arrangement, the first and second cutting tools are displaced in translation along the cutting direction. The sliding connection means ensures that the alignment of said cutting tools along the cutting direction is maintained during their overall rotational movement.

Preferably, the first tool comprises a first blade provided with a bevel defining a first cutting edge, the second tool comprises a second blade provided with a bevel defining a second cutting edge, the bevels being opposed to allow an overlapping of the cutting edges, preferably during a time interval defined by an initial time and an end time, corresponding respectively to inactive positions and active positions of the blades along the cutting direction.

By this arrangement, the risk of deforming the fiber during cutting is reduced or even eliminated. In the case of a pre-impregnated fiber, the risk of sticking the fiber to one or the other moving blade is reduced or even eliminated. This allows a fiber to be cut "in the middle", that is without deviation from the guiding plane defined by the guiding means.

This arrangement also slows down the wear of the blades over time, since the cutting force is distributed over the two blades.

The cutting edges of the two blades can be rectilinear, curvilinear or have a broken line, for example V-shaped.

Rectilinear cutting edges can extend parallel to each other from the inactive to the active position of the blades in the cutting direction to instantly cut the fiber across its entire width.

Preferably they form a non-zero constant cutting angle, from the inactive positions of the blades to their active positions, one blade or both blades then having an inclined cutting edge, the cutting edge(s) forming an angle different from 90° with the cutting direction, the cutting edge(s) being inclined with respect to a direction perpendicular to the cutting direction. Preferably also, the bisector of the cutting angle is perpendicular to the cutting direction, whereby both blades have an inclined cutting edge.

By this arrangement, the time interval is reduced in comparison with previous cutting systems. Indeed, the cutting point defined by the apex of the cutting angle propagates faster at the intersection of the cutting edges when the blades are both movable along the cutting direction. This arrangement also enables the cutting of wide fibers with a reduced cutting force.

In order to cut a fiber "in the middle", that is without deviation of the fiber from the guiding plane, the blades will be fixed with respect to blade holders in such a way that the bisector of the cutting angle is contained in the fiber guiding plane and the blade holders will be displaced at a same translational speed to maintain the bisector in this plane, from inactive positions to active positions of the blades.

According to a particular embodiment, each blade comprises two cutting edges, as described in patent document US2017/0197372, with a first cutting edge at a distal end of the blade and a second cutting edge at an edge of a window of the blade, the movable blades then being able to cut a fiber via the first cutting edges by displacement of the blades in a first direction in the cutting direction, and to cut a fiber passing through the two superimposed windows of the blades via the second cutting edges by displacement of the blades in the second opposite direction.

Embodiments of the present invention also relate to a method for manufacturing a composite material part comprising the application of continuous fibers onto an application surface, characterized in that the application of fibers is carried out by means of a fiber application head as previously described, by relative displacement of the application head with respect to the layup surface along layup trajectories.

The fibers conventionally used are continuous flat fibers, also called tows, generally unidirectional, and comprising a multitude of filaments. The deposited fibers may be dry fibers or fibers preimpregnated with thermosetting or thermoplastic resin. The fibers are typically ⅛, ¼ or ½ inch wide. The term "fiber" in this document also refers to fibers of greater width, greater than ½ inch, conventionally referred to as tape in placement technology, for example, of 1 inch, 1.5 inch or 2 inches.

Other advantages of the invention will become apparent from the description of the embodiments illustrated by the drawings.

DETAILED DESCRIPTION

According to a first embodiment of the invention, illustrated by FIGS. 1 to 6, an application head comprises an application roller 1, and for each fiber, guiding means 3 defining a guiding plane P for guiding the fiber entering into the head along a guiding plane towards the roller, and a cutting system 5. The guiding means of a fiber are for example formed by a guiding channel formed at the assembly interface of two plates, the guiding plane corresponding to a median longitudinal plane of the channel. When the head is intended for the application of a strip of several fibers, the head comprises a guiding channel for each fiber and a cutting system for each fiber, and may comprise a single roller for applying all the fibers, or several rollers, for example one roller for each fiber. Other guiding means may include tube sections or one or more pulleys.

Figure 1:
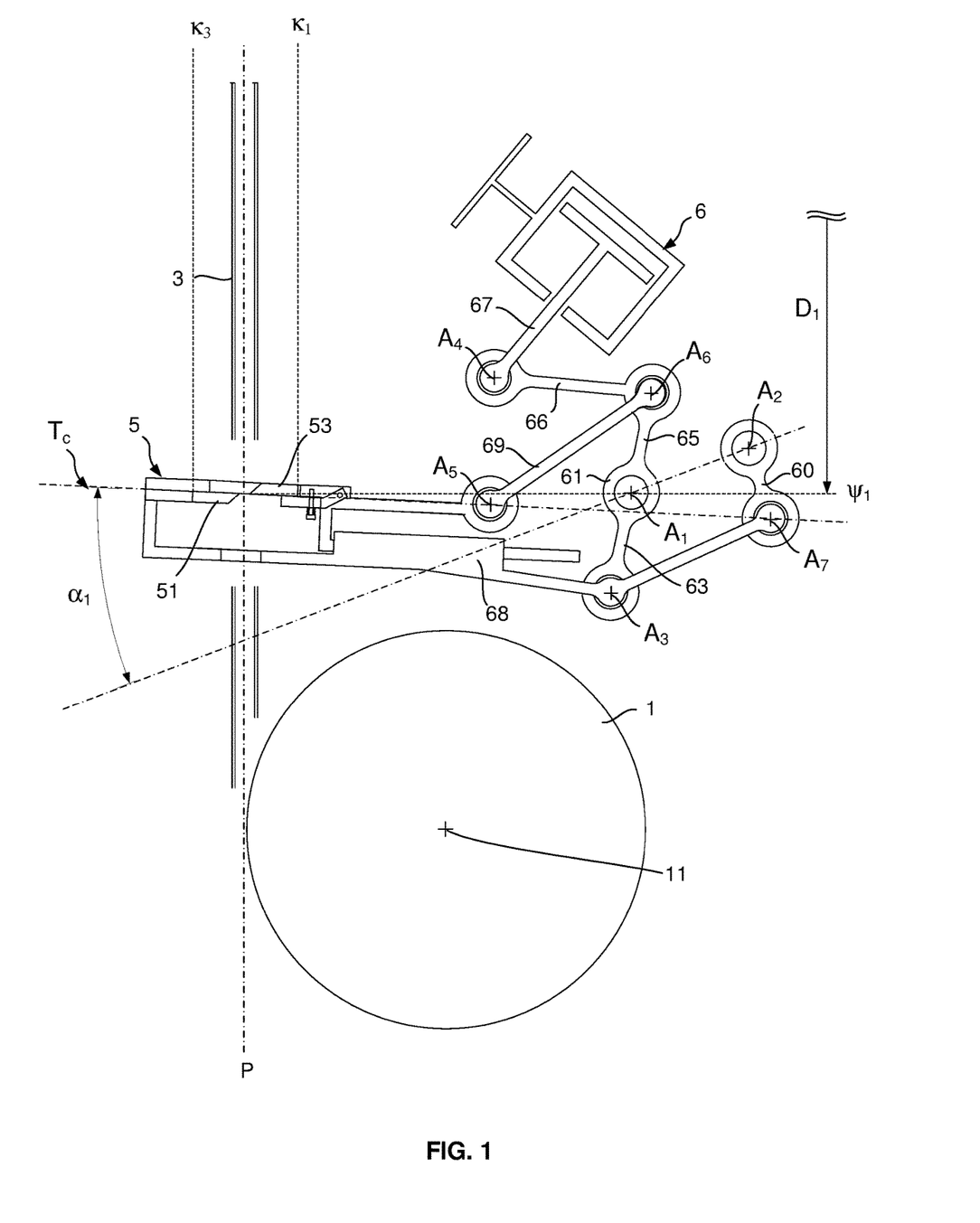
FIG. 1 is a schematic view of the cutting system according to a first embodiment of the invention, showing the blades in an initial position along the guiding plane and in two inactive positions along the cutting direction.
Figure 2:
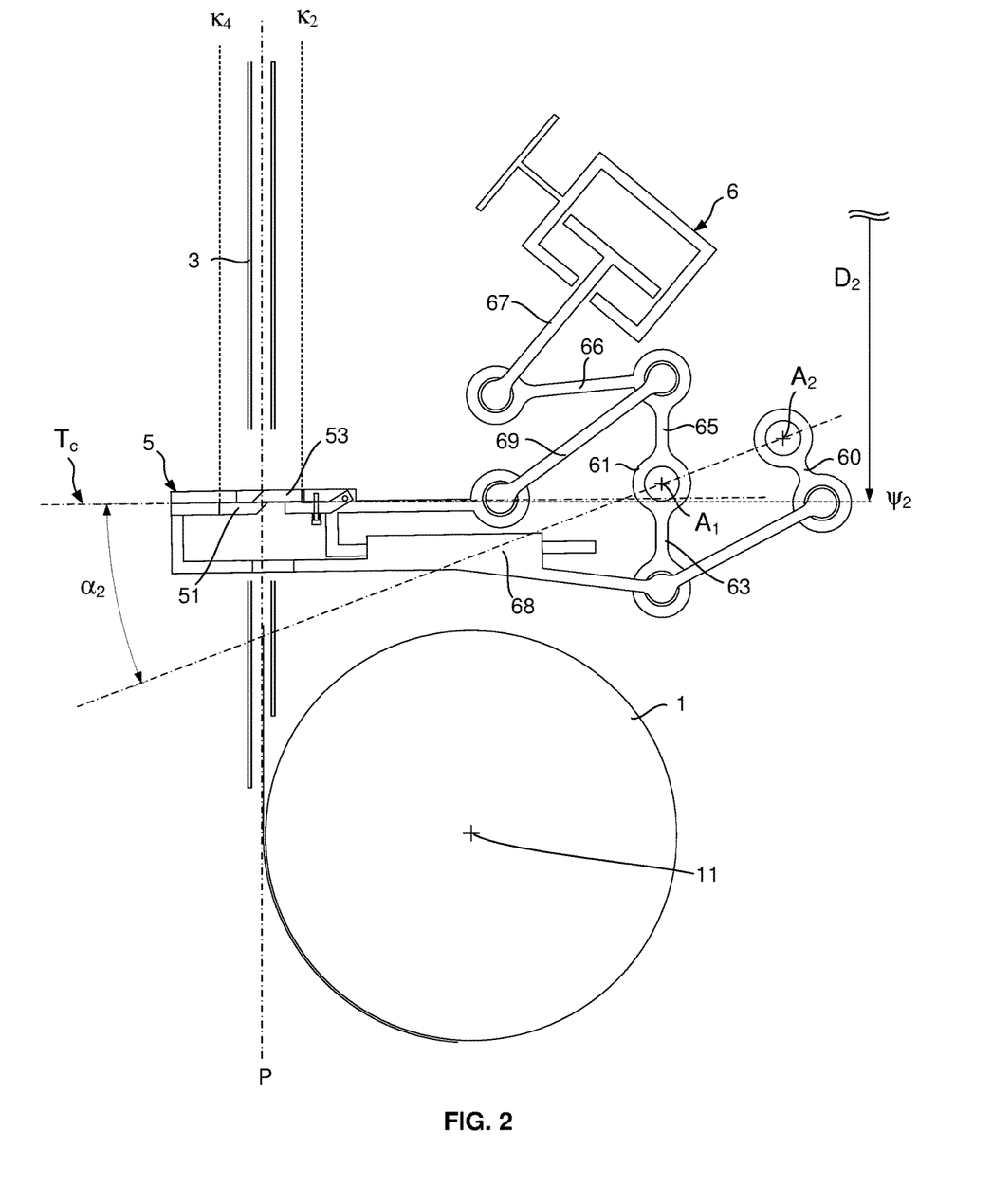
FIG. 2 is a schematic view of the cutting system, showing the blades in an end position along the guiding plane and in two active positions along the cutting direction.

The cutting system 5 comprises first and second blades 51, 53 movable in translation along a cutting direction $T_c$ between two inactive positions $\kappa_1$, $\kappa_3$ and two active positions $\kappa_2$, $\kappa_4$. Said blades 51, 53 are movable together between an initial cutting position $\psi_1$ and a final cutting position $\psi_2$ representing a variation in distance along the guiding plane P.

An integrated control means 6 is adapted to displace the first and second blades 51, 53 in translation along the cutting direction $T_c$ and to displace them together between the initial cutting position $\psi_1$ and final cutting position $\psi_2$, in rotation around a direction parallel to the axis 11 of the application roller 1, the integrated control means being adapted to displace the blades between their inactive and initial positions and their active and final positions.

The integrated control means comprise a control lever 61 movable around a first rotation axis $A_1$ and provided with a first lever arm 63 and a second lever arm 65, 66. A first blade holder 57 carrying the first blade 51 is articulated to the first lever arm 63. A second blade holder 59 carrying the second blade 53 is articulated to the second lever arm 65, 66 by means of a link 69. The lever 61 is controlled in displacement by the rod 67 of a cylinder, articulated to the second lever arm 65, 66. The first blade holder 57 is articulated to a second rotation axis $A_2$ by means of a link 60 and said first and second blade holders 57, 59 being connected to each other by a sliding connecting means 68 for sliding along the cutting direction.

The rotation axes $A_1$ and $A_2$ are fixed with respect to a support structure of the application head, the cylinder being fixedly mounted by its cylinder body to said support structure. It should be noted that the connection between the cylinder rod 67 and the intermediate link 66 has a clearance, for example in the form of an oblong slot. Alternatively, the cylinder is mounted with a clearance with respect to the mounting support structure.

The rotation axes $A_1$ and $A_2$ are parallel to the guiding plane P and the rotation axis 11 of the compaction roller. The first lever arm 63 is articulated by its end to the first blade holder 57 around a pivot axis $A_3$, and the second lever arm is articulated by its end to the cylinder rod around a pivot axis $A_4$, the two lever arms forming an angle between them, the axes $A_1$, $A_3$ and $A_4$ being not contained in a same plane.

The link 69 is articulated by a first end to the second blade holder 59 around a pivot axis $A_5$ and by its second end to the second lever arm around a pivoting axis $A_6$, this pivot axis $A_6$ being arranged between axis $A_1$ and axis $A_4$, on the side of the plane passing through axis $A_1$ and axis $A_4$ which is opposite to axis $A_5$. In the present embodiment shown in the figures, the axes $A_1$, $A_3$ and $A_6$ are aligned, contained in the same plane, and the distance between the axes $A_1$ and $A_3$ is equal to the distance between the axes $A_1$ and $A_6$. The rotation axis $A_2$ is arranged on the side of the plane passing through the axes $A_1$ and $A_3$ which is opposite to the blades and to the axis $A_5$, the link 60 being articulated at one end around the fixed axis $A_2$ and at the other end to the first blade holder around a pivot axis $A_7$ which is arranged on the same side of the plane passing through the axes $A_1$ and $A_3$ as the axis $A_2$. The pivot axes $A_3$-$A_7$ are parallel to the rotation axes $A_1$ and $A_2$.

Referring to FIG. 1, both blades 51, 53 are in the inactive positions $\kappa_1$, $\kappa_3$ along the cutting direction $T_c$. The direction $T_c$ makes an angle $\alpha_1$ with the direction passing through the rotation axes $A_1$ and $A_2$. This angle as well as the inactive positions $\kappa_1$, $\kappa_3$ along the cutting direction $T_c$ are determined by the angular orientation of the control lever 61, which is itself determined by the retracted position of the cylinder rod 67.

Referring to FIG. 2, both blades 51, 53 have displaced into the active positions $\kappa_2$, $\kappa_4$ along the cutting direction $T_c$. The direction $T_c$ makes an angle $\alpha_2$ with the direction passing through the axes of rotation $A_1$ and $A_2$. This angle as well as the active positions $\kappa_2$, $\kappa_4$ along the cutting direction $T_c$ are determined by the angular orientation of the control lever 61, which in turn is determined by the extended position of the cylinder rod 67.

In either of the angles $\alpha_1$, $\alpha_2$ taken by the cutting direction $T_c$, the blades 51, 53 remain aligned along said direction, which is ensured by the sliding connecting means 68.

Figure 3:
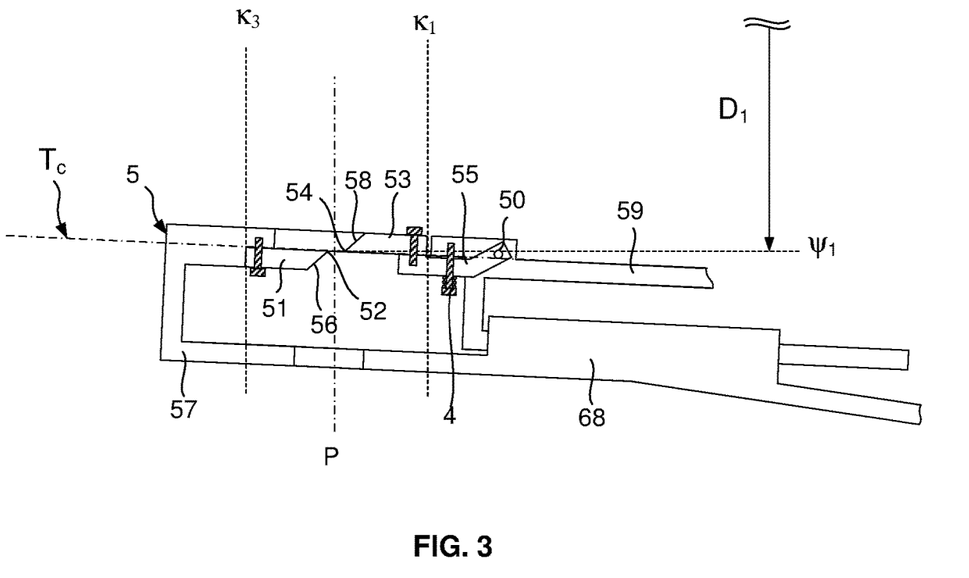
FIG. 3 is an enlarged partial view of the cutting system in FIG. 1.
Figure 5:
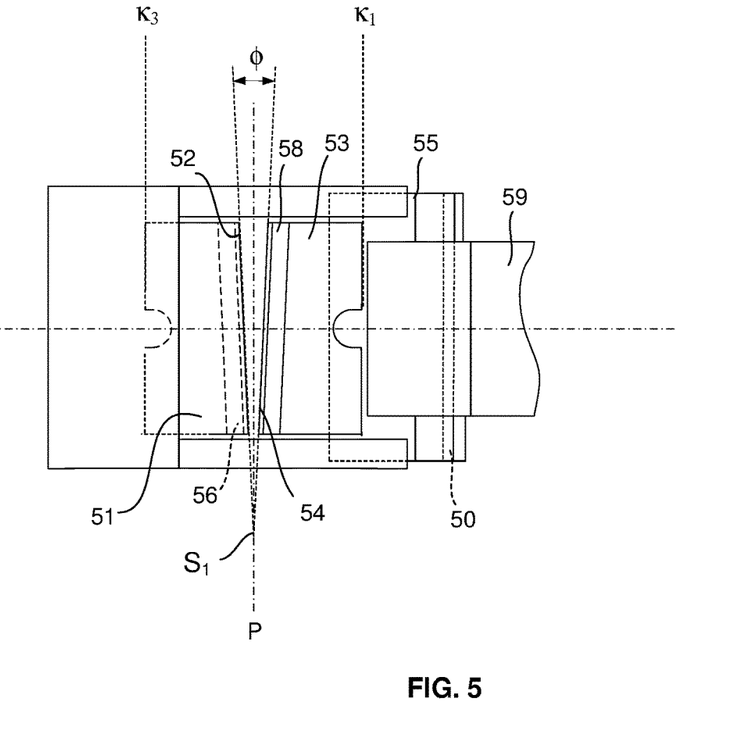
FIG. 5 is an enlarged view of the blades shown in FIG. 1, in top view.

Referring to FIGS. 3 and 5, the first and second blades 51, 53 are in their inactive positions $\kappa_1$, $\kappa_3$ along the cutting direction $T_c$. The apex of the cutting angle $\phi$ is in an initial position $S_1$ determined by said inactive positions $\kappa_1$, $\kappa_3$ in which the cutting edges 52, 54 of the bevels 56, 58 are not overlapped.

Figure 4:
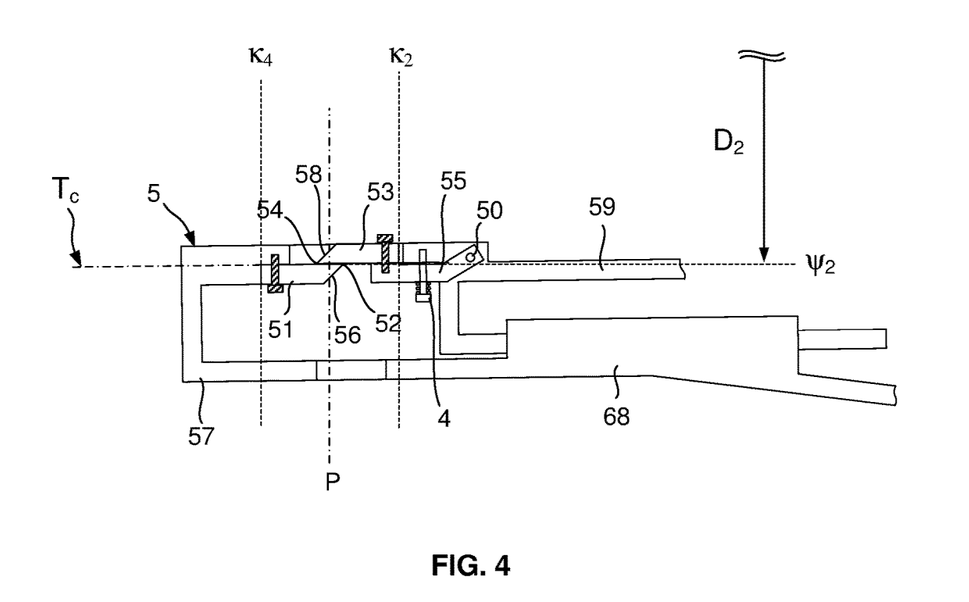
FIG. 4 is an enlarged partial view of the cutting system in FIG. 2.
Figure 6:
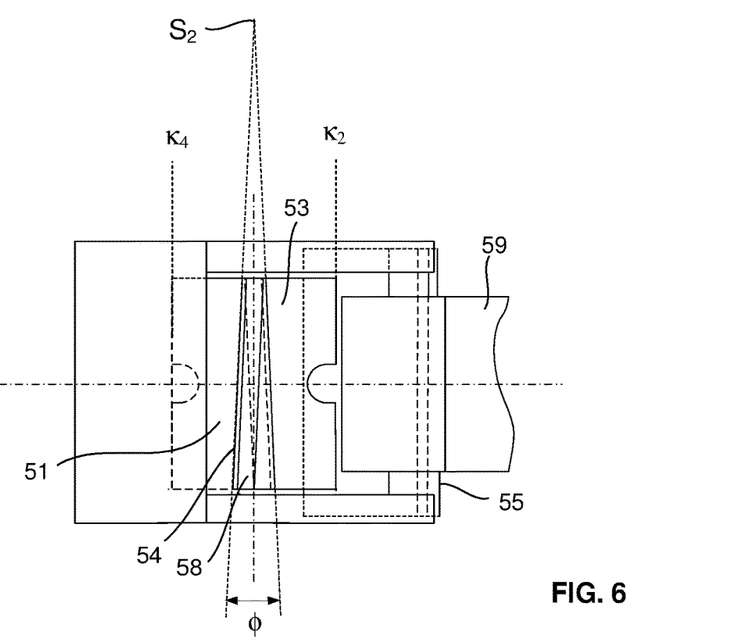
FIG. 6 is an enlargement of the blades shown in FIG. 2, in top view.

Referring to FIGS. 4 and 6, the first and second blades 51, 53 have displaced into their active positions $\kappa_2$, $\kappa_4$ in the cutting direction $T_c$. The apex of the cutting angle $\phi$ is in an end position $S_2$ determined by said active positions $\kappa_2$, $\kappa_4$ in which the cutting edges 52, 54 of the bevels 56, 58 are overlapped.

Between the inactive positions $\kappa_1$, $\kappa_3$ and active positions $\kappa_2$, $\kappa_4$, the apex $S_1$, $S_2$ of the cutting angle $\phi$ has propagated as the overlapping of the cutting edges 52, 54 has increased.

The cutting edges 52, 54 are rectilinear and form a constant cutting angle $\phi$, from the inactive positions $\kappa_1$, $\kappa_3$ to the active positions $\kappa_2$. The bisector of the cutting angle $\phi$ is perpendicular to the cutting direction $T_c$. In FIGS. 5 and 6, the inactive positions $\kappa_1$, $\kappa_3$ and the active positions $\kappa_2$, $\kappa_4$ are advantageously chosen symmetrically with respect to the guiding plane P so that the bisector of the cutting angle $\phi$ is coincident with said plane P.

The first blade 51 is fixed to a first blade holder 57. The second blade 53 is fixed to a second blade holder 59 by means of a part 55 pivoting relative to said second blade holder 59 around an axis 50 and pressed against the first blade holder 57 by an elastic return means to control the clearance necessary for the overlapping of the cutting edges 52, 54 of the blades 51, 53. The elastic return means is, for example, a spring mounted around a screw 4 passing through the intermediate part 55 to be screwed into the second blade holder 59, the spring being arranged between the screw head and the intermediate part. According to an embodiment variant, the second blade is elastically biased in abutment directly against the first blade, either flat or by its cutting edge, for example according to the mounting principle described in the above-mentioned application WO 2017/072421.

A second embodiment of the invention differs from the previous one in that only one of the two cutting tools is movable in translation along the cutting direction, the other tool being in a fixed position along said direction. Document WO 2008/132301 describes, for example, a movable blade coming, in the active position, into abutment against a counter-tool which is fixed in the cutting direction and is made of a bar of elastomeric material.

The application head according to the invention is specially designed to be installed in a fiber placement machine for the production of composite material parts. It is completed, FIGS. 7 to 10, for each fiber, by a clamping system 7 and rerouting means 9.

The clamping system 7 comprises first and second clamping tools 71, 73 movable along a clamping direction $T_b$ between two inactive positions and two active positions in which they abut against each other. A control means 8 is able to displace said first and second clamping tools 71, 73 in translation along the clamping direction $T_b$. It comprises a cylinder 81 actuating a cylinder rod 83 cooperating with the first and second clamping tools 71, 73 by means of a transmission cone 85.

Said clamping tools 71, 73 are movable together in translation between an initial clamping position $\beta_1$ and a final clamping position $\beta_2$ representing a variation in distance along the guiding plane P. They are displaced by a control means 10 comprising a cylinder 101 actuating a cylinder rod 103 able to displace the cylinder 81 of the control means 8.

Stripper means 41, 43 are fixed in relation to the structure used as support for the mounting of the application head. The inactive positions of the first and second clamping tools 71, 73 are set back along the clamping direction $T_b$ with respect to the fixed positions of the stripper means 41, 43. The stripper means 41, 43 are movable with said clamping tools 71, 73 in translation along the guiding plane and controlled in displacement by said control means 10.

The rerouting means 9 comprise a first roller 91 and a second roller 93 whose rotation axis 95 and 97 are aligned along a direction R away from the rotation axis 11 of application roller 1. The rerouting means 9 have a fixed position with respect to the application roller 1, between the blades 51, 53 on the one hand and said clamping tools 71, 73 on the other hand.

Figure 7:
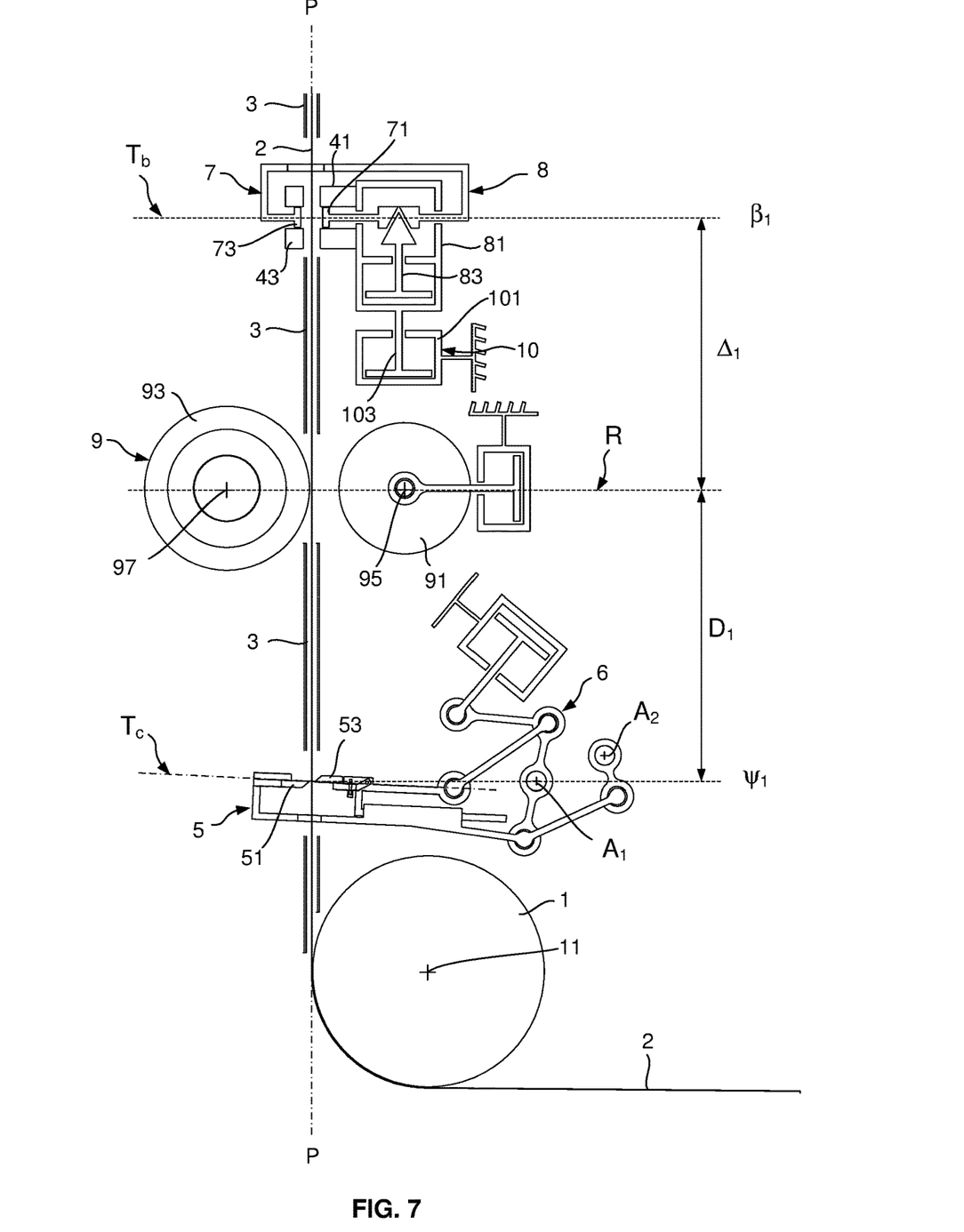
FIG. 7 is a schematic view of an application head, showing the cutting system and a clamping system in initial positions along the guiding plane.

Referring to FIG. 7, both blades 51, 53 are in their initial position $\psi_1$ in which the distance along the guiding plane P between the cutting direction $T_c$ and the fixed position of rerouting means is equal to $D_1$. Similarly, the two clamping tools 71, 73 are in their initial position $\beta_1$ in which the distance along the guiding plane P between the clamping direction $T_b$ and the fixed position of the rerouting means is equal to $\Delta_1$. Along the cutting direction $T_c$, the blades 51, 53 are in their inactive positions $\kappa_1$, $\kappa_3$ (FIG. 1). Along the clamping direction $T_b$, the clamping tools 71, 73 are in their inactive positions.

Figure 8:
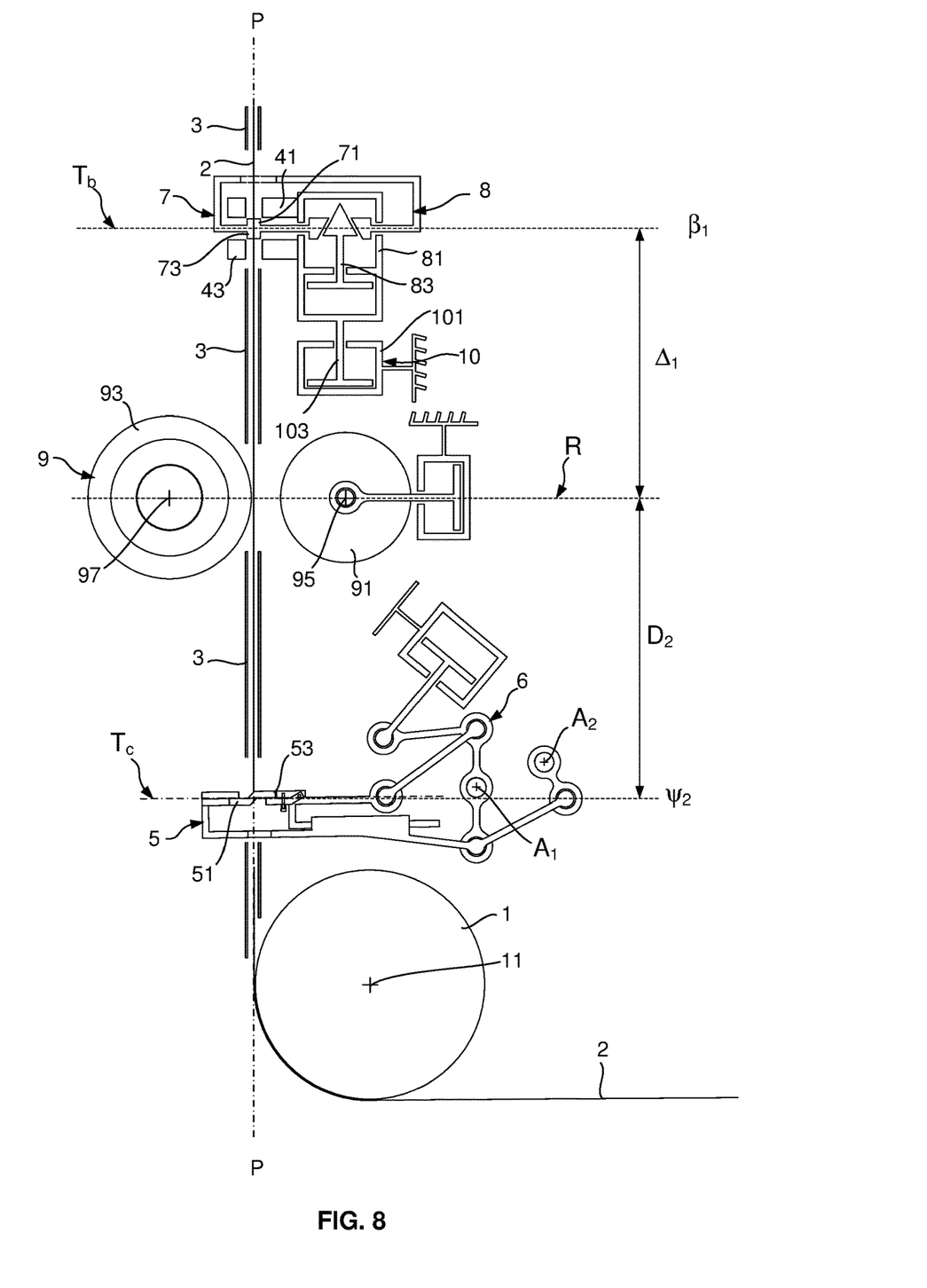
FIG. 8 is a schematic view of the application head in which the blades of the cutting system have displaced to an end position in the guiding plane.

Referring to FIG. 8, the two blades 51, 53 have displaced together to their final position $\psi_2$ in which the distance along the guiding plane P between the cutting direction $T_c$ and the fixed position of the rerouting means is equal to $D_2$. The two clamping tools 71, 73 have remained in the initial position $\beta_1$ shown in FIG. 7. Along the cutting direction $T_c$, the blades 51, 53 have displaced into their active positions $\kappa_2$, $\kappa_4$ (FIG. 2). Along the clamping direction $T_b$, the clamping tools 71, 73 have displaced into their active positions.

Figure 9:
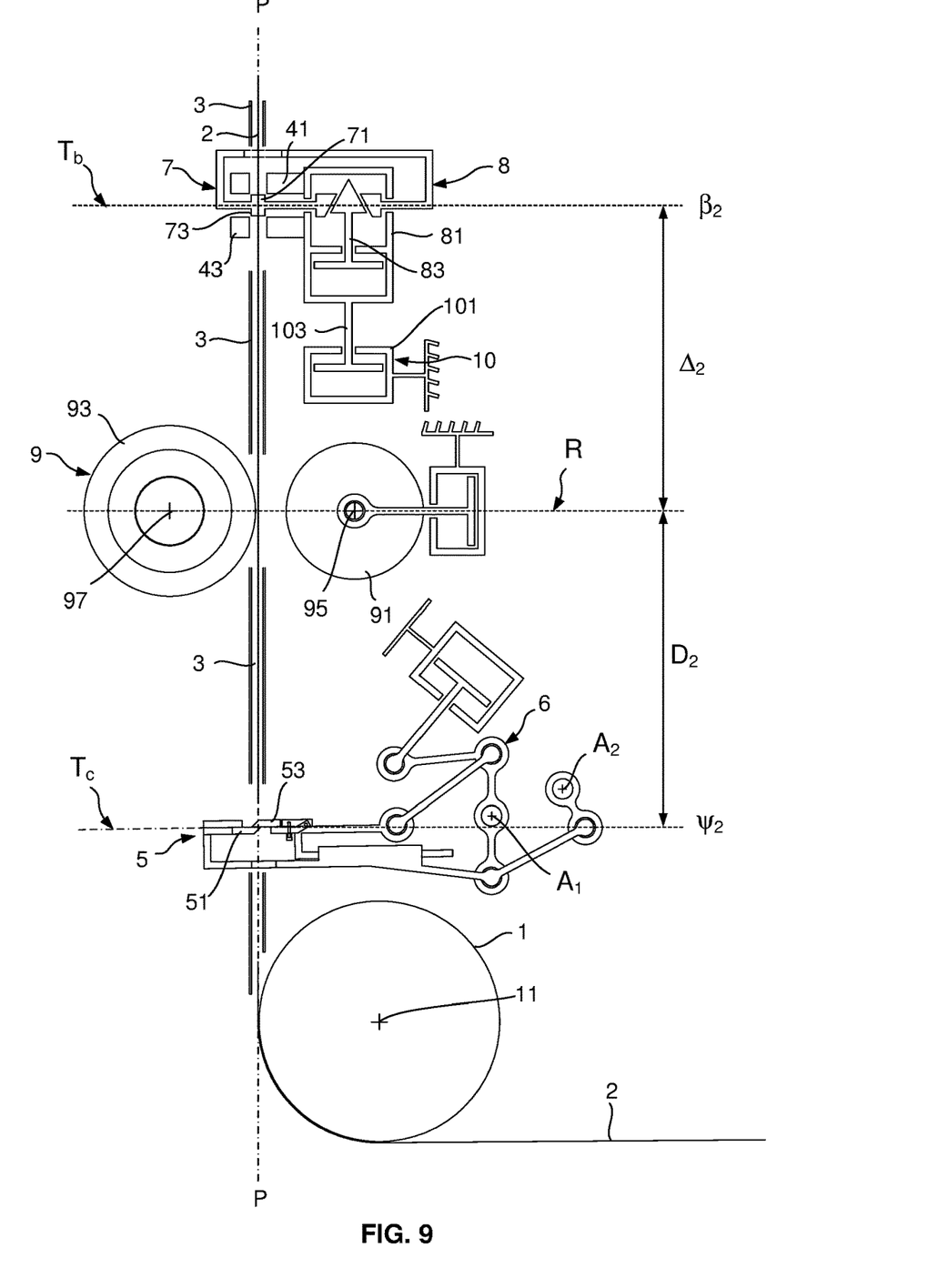
FIG. 9 is a schematic view of the application head, in which the clamping tools of the clamping system have displaced into an end position in the guiding plane.

Referring to FIG. 9, both blades 51, 53 have remained in their final position $\psi_2$ as shown in FIG. 8. The two clamping tools 71, 73 have displaced together into their final position $\beta_2$ for which the distance along the guiding plane between the clamping direction $T_b$ and the fixed position of the rerouting means is equal to $\Delta_2$.

Figure 10:
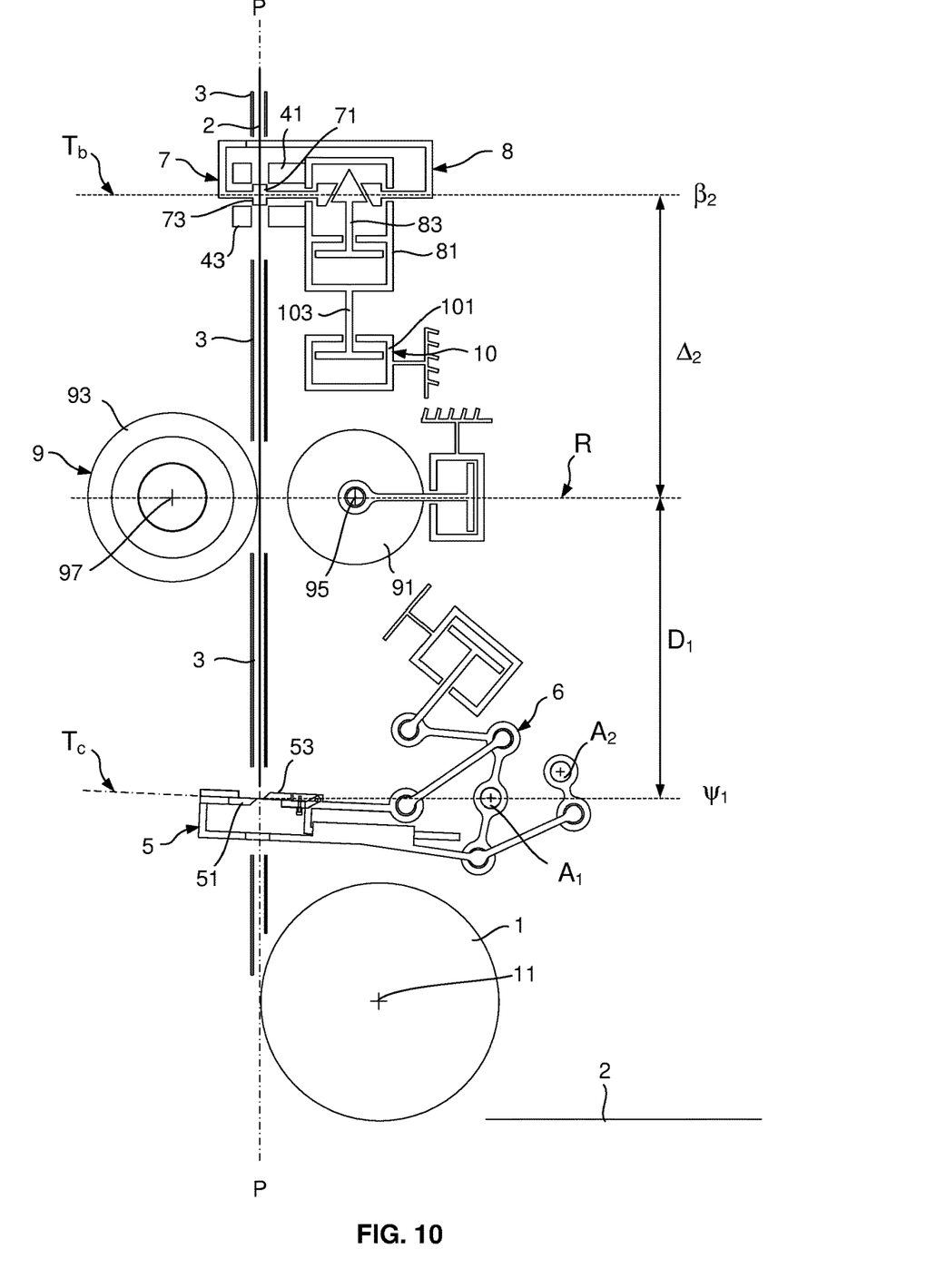
FIG. 10 is a schematic view of the application head, in which the blades of the cutting system are again in the initial position in the guiding plane.

Referring to FIG. 10, the two blades 51, 53 have displaced together to their initial position $\psi_1$ shown in FIG. 7. The two clamping tools 71, 73 have remained in their final position $\beta_2$ as shown in FIG. 9. Along the cutting direction $T_c$, the blades 51, 53 have displaced to their inactive positions $\kappa_1$, $\kappa_3$.

The initial distances $D_1$ and $\Delta_1$ are smaller than the final distances $D_2$ and $\Delta_2$. Thus, the initial and final cutting positions $\psi_1$, $\psi_2$ represent a positive variation of distance $D_2$-$D_1$ along the guiding plane P and the initial and final clamping position $\beta_1$, $\beta_2$ represent a positive variation of distance $\Delta_2$-$\Delta_1$ along the guiding plane P.

It is important to note that the direction R of the rerouting means is an arbitrary reference for the distances $D_1$, $\Delta_1$, $D_2$ and $\Delta_2$. The direction perpendicular to the guiding plane P and passing through axis 11 of application roller 1 is another arbitrary reference for locating said distances. It is sufficient that the reference direction is perpendicular to the guiding plane and has a fixed position in the application head.

A fiber 2 is applied to a substrate (not shown) by the application roller 1 as the application head displaces relative to the substrate. The fiber is guided by the guiding means in the guiding plane P.

A "cut on the fly" operation comprises the following steps:
　first step: FIG. 7, during layup, the fiber 2 circulates freely through the cutting tools formed by the blades 51, 53 and the clamping tools 71, 73. The inactive positions $\kappa_1$, $\kappa_3$ of the cutting tools define a rest state along the cutting direction $T_c$. Likewise, the inactive positions of the clamping tools define a rest state along the clamping direction $T_b$.
　second step: FIG. 8, the fiber 2 is cut by the blades 51, 53 and clamped by the clamping tools 71, 73. The active positions $\kappa_2$, $\kappa_4$ of the blades define an active state along the cutting direction $T_c$. Likewise, the active positions of the clamping tools define an active state in the clamping direction $T_b$.

Between the first and second steps, the blades 51, 53 have undergone, along the guiding plane P, the positive variation in distance $D_2$-$D_1$. This variation makes it possible to displace the cutting direction $T_c$ at the same time as fiber 2 and thus leads to cancelling the inclination of the cut end of the fiber.

The inactive positions $\kappa_1$, $\kappa_3$ along the cutting direction $T_c$ are symmetrical with respect to the guiding plane P and the blades 51, 53 are displaced towards their active positions $\kappa_2$, $\kappa_4$ at the same translation speed. Thus it is possible to cut the fiber 2 "in the middle", that is without deviation from the guiding plane P.

third step: FIG. 9, blades 51, 53 remain in the active state. Similarly, the clamping tools 71, 73 remain in the active state.

Between the second and third steps, the clamping tools 71, 73 have undergone the positive variation in distance $\Delta_2$-$\Delta_1$ along the guiding plane P. This variation makes it possible to displace the cut and clamped fiber 2 in the opposite direction to the travel direction imposed by the rotation direction of the application roller 1.

fourth step: FIG. 10, the blades 51, 53 are again in the resting state. The clamping tools 71, 73 remain in the active state.

Between the third and fourth steps, the blades 51, 53 have undergone, along the guiding plane P, the negative variation in distance $D_1$-$D_2$. The variation in distance $\Delta_2$-$\Delta_1$ of the clamping tools 71, 73 is chosen to be greater than the variation of distance $D_2$-$D_1$ of the cutting tools to allow the latter to return to the distance $D_1$ of the rerouting means 9 without the risk of coming into contact with the fiber 2.

fifth step: the clamping tools 71, 73 are again in the resting state. The blades 51, 53 remain in the resting state. The fiber 2 circulates freely after it has been rerouted by the rerouting means.

Between the fifth step and the first step of the next "on-the-fly" cut, the clamping tools 71, 73 are subjected to the negative variation in distance $\Delta_1$-$\Delta_2$ along the guiding plane P.

The "on-the-fly" cut operation described above can be carried out with an application head in which only one of the two clamping tools is movable in translation along the clamping direction, the other tool being in a fixed position along said direction. Document WO 2008/132301 or EP 846551 describes a movable jaw which, in the active position, abuts against a counter-tool which is fixed along the clamping direction.

The invention claimed is:

1. Application head specially designed for producing composite material parts, comprising an application roller presenting a rotation axis, guiding means defining a guiding plane and a cutting system for cutting a fiber guided by the guiding means and applied by the application roller, the cutting system comprising a first tool movable in translation along a cutting direction and a second tool, wherein the cutting system comprises an integrated control means able to displace at least the first tool in translation along the cutting direction and to displace the first and second tool together, in rotation around a direction parallel to the rotation axis of the application roller.

2. Application head according to claim 1, wherein the integrated control means is able to displace the first tool and the second tool in translation along the cutting direction.

3. Application head according to claim 2, wherein the integrated control means comprises a control lever movable around a first rotation axis and provided with a first lever arm articulated to a first tool holder carrying the first tool and a second lever arm articulated, by means of a link, to a second tool holder carrying the second tool, said second lever arm being controlled in displacement by a cylinder rod, said first blade holder being articulated to a second rotation axis by means of a link and said first and second tool holders being connected together by a sliding connecting means for sliding along the cutting direction.

4. Application head according to claim 1, wherein the first tool comprises a first blade provided with a bevel defining a first cutting edge, the second tool comprises a second blade provided with a bevel defining a second cutting edge, said bevels being opposed to allow an overlapping of said cutting edges.

5. Application head according to claim 4, wherein the first and second cutting edges are rectilinear, and at least one of the two cutting edges is inclined relative to the guiding plane, so that the two cutting edges form a cutting angle between them.

6. Application head according to claim 5, wherein the first cutting edge and the second cutting edge are inclined so that the bisector of the cutting angle between the first cutting edge and the second cutting edge is perpendicular to the cutting direction.

7. Method for manufacturing a composite material part comprising the application of continuous fibers onto an application surface, wherein the application of fibers is carried out by means of a fiber application head according to claim 1, by relative displacement of the application head with respect to the layup surface along layup trajectories.

* * * * *